(12) United States Patent  
Hatanaka et al.

(10) Patent No.: US 8,887,583 B2  
(45) Date of Patent: Nov. 18, 2014

(54) MANIPULATED POSITION DETECTION DEVICE

(75) Inventors: Shinji Hatanaka, Okazaki (JP); Kunihiro Nakagawa, Anjo (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 399 days.

(21) Appl. No.: 13/199,668

(22) Filed: Sep. 7, 2011

(65) Prior Publication Data

US 2012/0055268 A1    Mar. 8, 2012

(30) Foreign Application Priority Data

Sep. 8, 2010    (JP) .................................. 2010-200887

(51) Int. Cl.
*G01L 1/04*    (2006.01)
*G06F 3/041*    (2006.01)

(52) U.S. Cl.
CPC .................................. *G06F 3/0414* (2013.01)
USPC .................................................... 73/862.621

(58) Field of Classification Search
CPC .............................. G06F 3/041; G06F 3/0414
See application file for complete search history.

(56) References Cited

U.S. PATENT DOCUMENTS

| | | | | |
|---|---|---|---|---|
| 5,708,460 | A * | 1/1998 | Young et al. ................... | 345/173 |
| 6,293,160 | B1 | 9/2001 | Shigmoto | |
| 2007/0245836 | A1 * | 10/2007 | Vaganov .................. | 73/862.621 |

FOREIGN PATENT DOCUMENTS

| | | |
|---|---|---|
| JP | 05-298013 | 11/1993 |
| JP | 7-250822 | 10/1995 |
| JP | 7-250823 | 10/1995 |
| JP | 10-108851 | 4/1998 |
| JP | 11-296295 | 10/1999 |
| JP | 2006-252093 | 9/2006 |
| JP | 2006252093 A * | 9/2006 |

OTHER PUBLICATIONS

Office Action mailed Jul. 24, 2012 issued in corresponding Japanese Application No. 2010-200887 with English translation.
Office action dated Feb. 14, 2013 in corresponding Japanese Application No. 2010-200887.
Office Action issued Nov. 27, 2013 in corresponding CN Application No. 201110276081.4 (with English translation).

* cited by examiner

*Primary Examiner* — Lisa Caputo
*Assistant Examiner* — Brandi N Hopkins
(74) *Attorney, Agent, or Firm* — Harness, Dickey & Pierce, PLC (57) ABSTRACT

A case accommodates a manipulated surface portion. A distortion member has a joint portion, which is connected with a periphery of the manipulated surface portion at one end, and a fixed portion fixed to the case at the other end. The distortion member has a movement transmission surface between the joint portion and the fixed portion. The movement transmission surface is movable according to a manipulating force caused by pressure applied to the manipulated surface portion. A distortion detection unit is adhered to the movement transmission surface and configured to detect a distortion of the movement transmission surface caused by a movement of the distortion member. The manipulated surface portion and the movement transmission surface are located on the same plane.

10 Claims, 12 Drawing Sheets

| ELEMENT | RESISTANCE |
|---------|------------|
| 4a | INCREASE |
| 4b | INCREASE |
| 4c | DECREASE |
| 4d | DECREASE |

FIG. 8B $$F_z = f_{z1} + f_{z2} \quad \cdots (1\text{-}1)$$

$$F_z \cdot x_1 = f_{z1} \cdot \frac{w}{2} - f_{z2} \cdot \frac{w}{2} \quad \cdots (1\text{-}2)$$

$$F_z \cdot y_1 = m_{z1} + m_{z2} \quad \cdots (1\text{-}3)$$

$$x_1 = \frac{f_{z1} \cdot \frac{w}{2} - f_{z2} \cdot \frac{w}{2}}{f_{z1} + f_{z2}} \quad \cdots (1\text{-}4)$$

$$y_1 = \frac{m_{z1} + m_{z2}}{f_{z1} + f_{z2}} \quad \cdots (1\text{-}5)$$

FIG. 17  PRIOR ART $$F_z \cdot \cos\theta = f_{z1} + f_{z2} + f_{z3} + f_{z4} \qquad \cdots (2\text{-}1)$$

$$F_z \cdot \cos\theta \cdot x_d + F_z \cdot \sin\theta \cdot h = (f_{z1} + f_{z4}) \cdot \frac{w}{2} - (f_{z2} + f_{z3}) \cdot \frac{w}{2} \qquad \cdots (2\text{-}2)$$

$$x_d + \tan\theta \cdot h = \frac{\{(f_{z1} + f_{z4}) - (f_{z2} + f_{z3})\} \cdot \frac{w}{2}}{f_{z1} + f_{z2} + f_{z3} + f_{z4}} \qquad \cdots (2\text{-}3)$$

MANIPULATED POSITION DETECTION DEVICE

CROSS REFERENCE TO RELATED APPLICATIONS

This application is based on and claims priority to Japanese Patent Application No. 2010-200887 filed on Sep. 8, 2010, the contents of which are incorporated in their entirely herein by reference.

FIELD OF THE INVENTION

The present invention relates to a manipulated position detection device configured to identify a position of a force working on a manipulated surface. For example, the manipulated position detection device may be a touchpad or a touchscreen having a manipulated surface and configured to detect a load applied to the manipulated surface.

BACKGROUND OF THE INVENTION

Figure 16A:
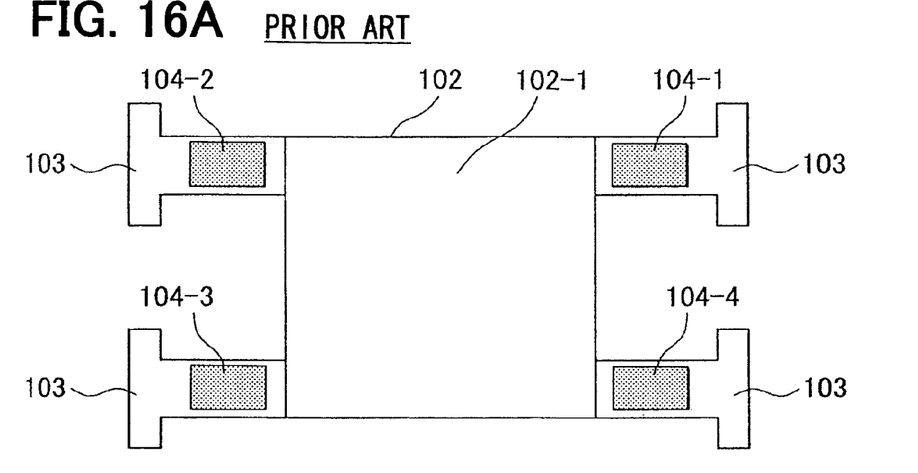
FIGS. 16A, 16B are views showing a manipulated position detection device according to a prior art.
Figure 16B:
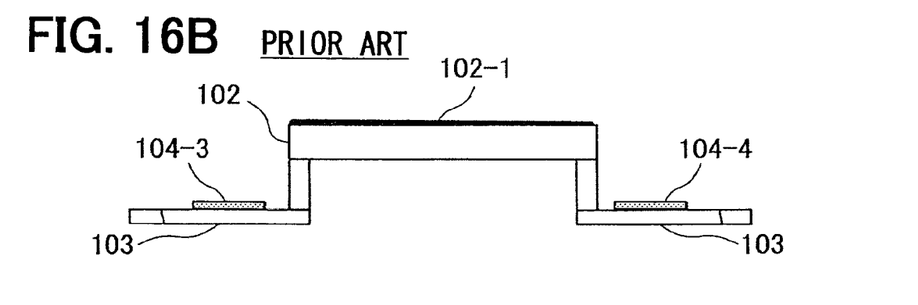
Figure 17:
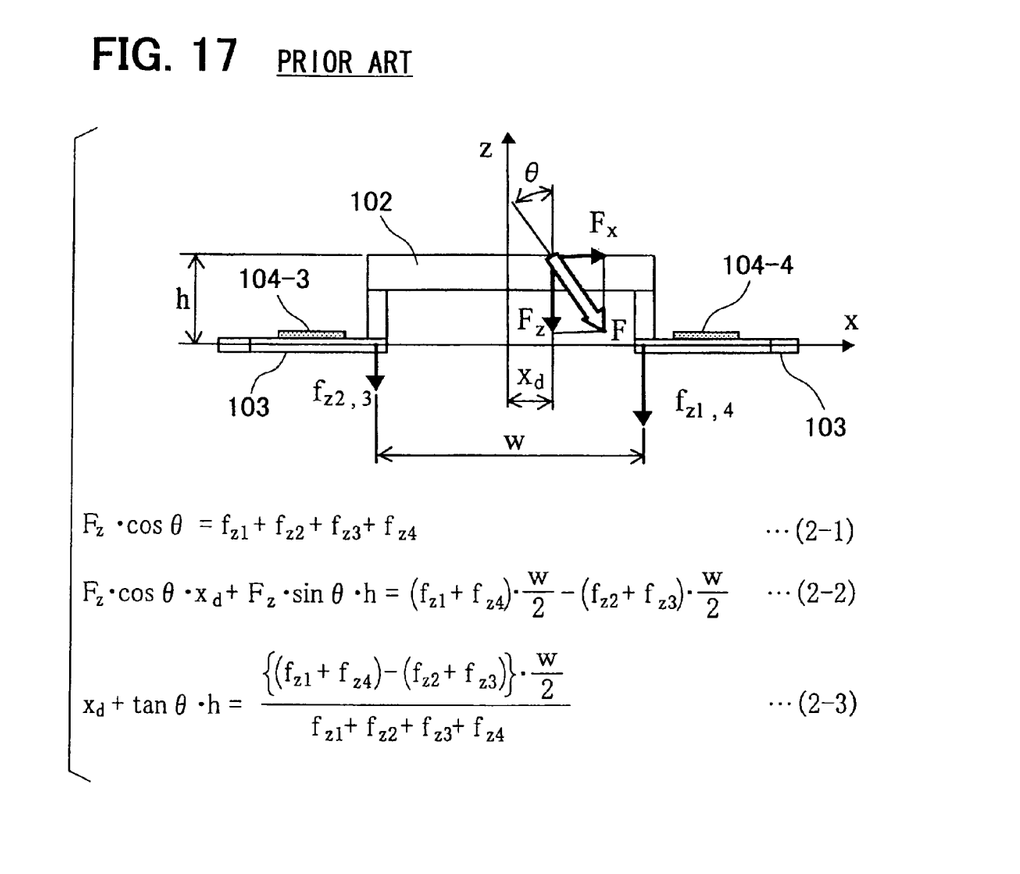
FIG. 17 is a view showing the manipulated position detection device according to the prior art.

For example, Japanese patent No. 2760472 discloses a manipulated position detection device. The manipulated position detection device includes a square detection plate having a manipulated surface on which a user places a foot. The square detection plate has a detection surface on the opposite side of the manipulated surface. A load sensor is provided to each of the three sides or four sides of the detection surface. FIGS. 16A, 16B, and FIG. 17 show an example of the manipulated position detection device including four load sensors provided to four sides of the surface opposite from the manipulated surface. Load sensors 104-1 to 104-4 are laid under the surface of a distortion member 103 on the opposite side of a manipulated surface 102-1 of a detection plate (manipulated surface) 102. In the present example, the manipulated surface and a movement transmission surface of the distortion member 103 are not located in the same plane or are not located in planes at substantially equivalent (same) levels.

In the present example, a force F is applied at the angle θ relative to the direction perpendicular to the manipulated surface 102-1. In this case, application is deviated by the distance xd corresponding to the angle θ from the barycenter position calculated by a generally-known barycenter calculating method using the equations (2-1) to (2-3). Therefore, the deviation xd needs to be corrected using an additional detection unit in order to calculate the accurate barycenter position.

SUMMARY OF THE INVENTION

In view of the foregoing and other problems, it is an object of the present invention to produce a manipulated position detection device configured to detect accurately the center position of a force working on a manipulated surface.

According to one aspect of the present invention, a manipulated position detection device comprises a manipulated body including a manipulated surface portion substantially being in a plate shape. The manipulated position detection device further comprises a case accommodating the manipulated body. The manipulated position detection device further comprises a distortion member being in a plate shape, the distortion member having a joint portion connected with a periphery of the manipulated surface portion at one end, the distortion member further having a fixed portion fixed to the case at an other end, the distortion member having a movement transmission surface between the joint portion and the fixed portion, the movement transmission surface being movable according to a manipulating force caused by pressure applied to the manipulated surface portion. The manipulated position detection device further comprises a distortion detection unit adhered to the movement transmission surface of the distortion member and configured to detect a distortion of the movement transmission surface caused by a movement of the distortion member. The manipulated position detection device further comprises a manipulated position arithmetic unit configured to calculate a manipulating force working on the manipulated surface portion and a manipulated position on which a manipulating force works, according to a detection result of the distortion detection unit. The manipulated surface portion and all the movement transmission surface are located on a same plane.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS (First Embodiment)

Figure 1:
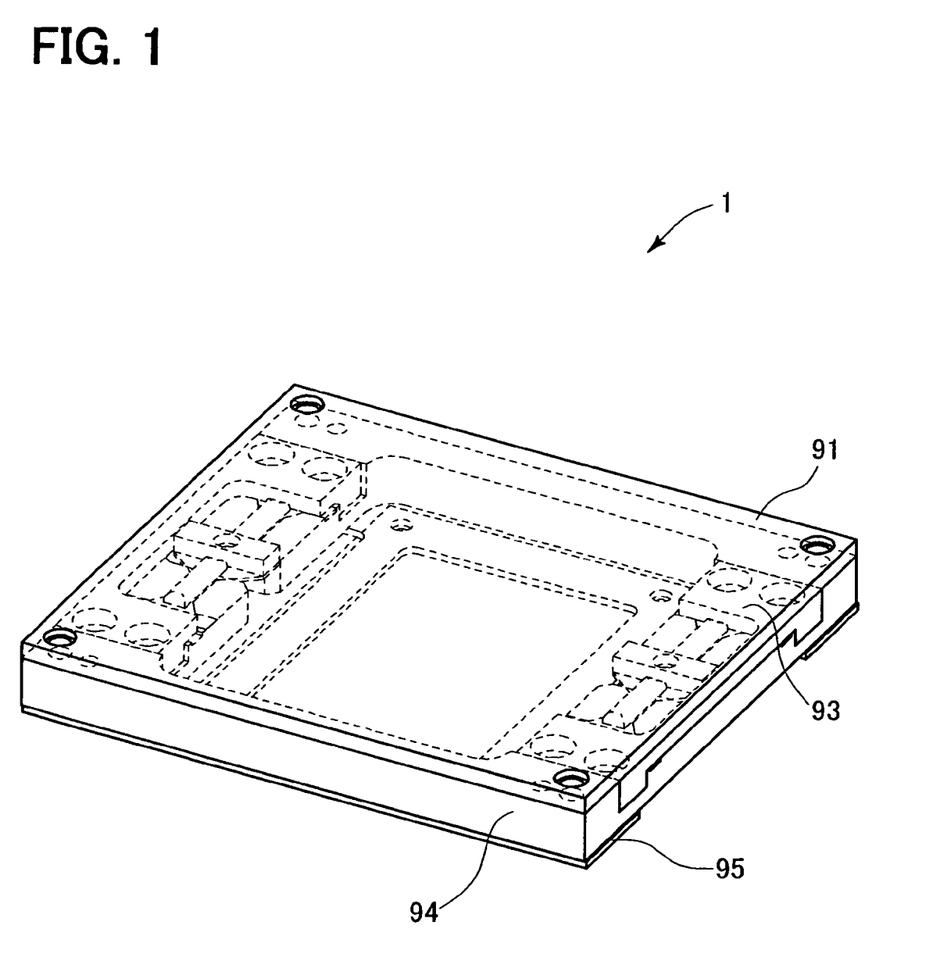
FIG. 1 is a perspective view showing one example of a manipulated position detection device.
Figure 2:
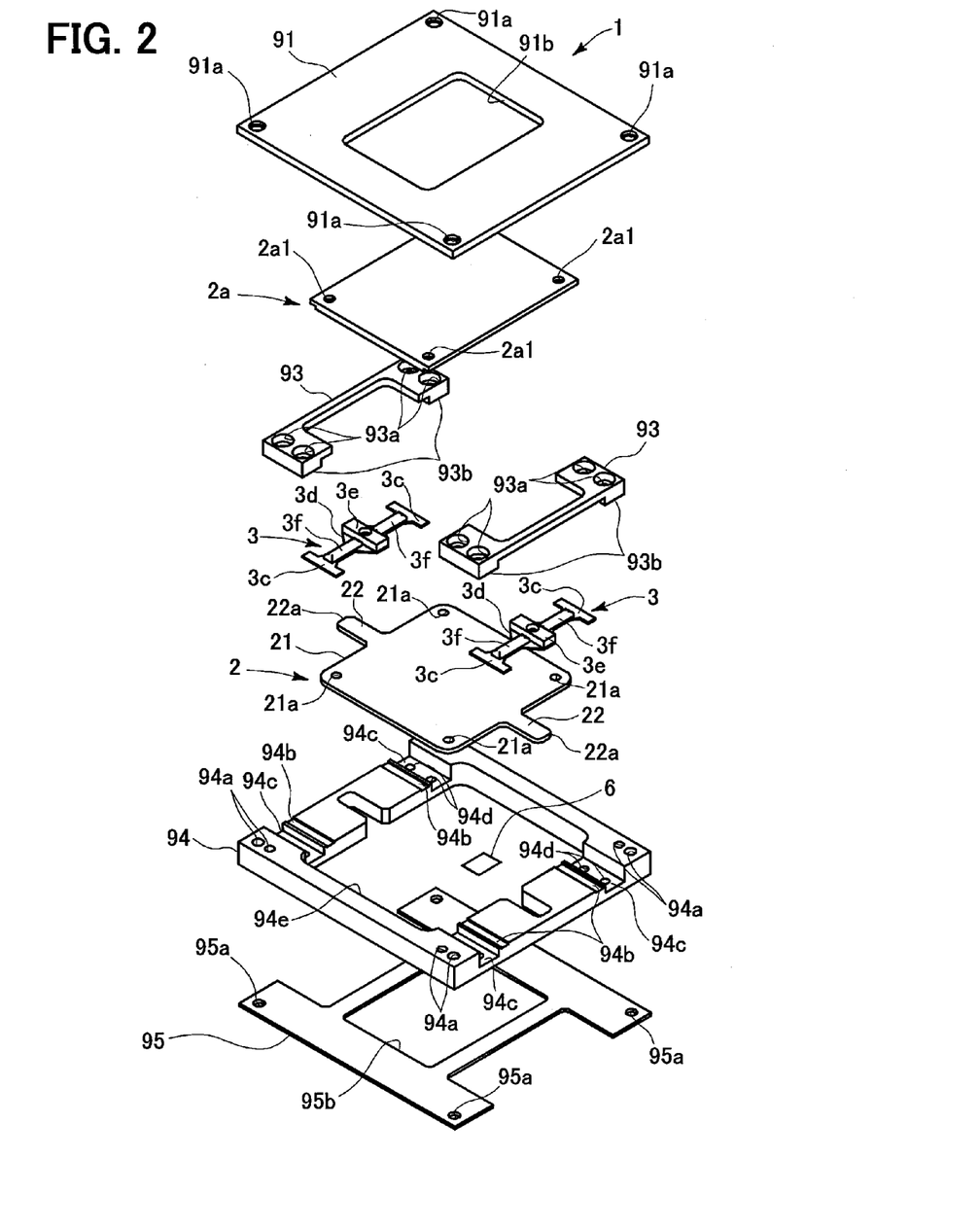
FIG. 2 is an exploded perspective view showing the manipulated position detection device.

FIG. 1 is a perspective view showing one example of a manipulated position detection device. FIG. 2 is an exploded perspective view showing the manipulated position detection device. The manipulated position detection device 1 shown in FIGS. 1, 2 includes an upper cover 91, a pressing member 93, a case 94, a bottom cover 95, a manipulated body 2, and the like.

The upper cover 91 is provided to fortify the manipulated position detection device 1, to protect against dust, and/or to enhance design nature. The upper cover 91 is mounted to, for example, a screen of a display device or a frame of a screen (none shown). The upper cover 91 is, for example, screwed using screw holes 91a together with screw holes 94a of the case 94 and screw holes 95a of the bottom cover 95. The upper cover 91 has an opening 91b through which a user can operate a manipulated surface (manipulated surface portion) 2a.

The manipulated surface 2a is formed of a seat material having optical transparency. The manipulated surface 2a also functions to protect the surface of the manipulated body 2 and/or to enhance fanciness of the manipulated position detection device 1. The manipulated surface 2a may be integrally formed with the manipulated body 2. An ornament may be provided to the manipulated surface 2a as long as viewability of the display device (not shown) is secured. The manipulated surface 2a is, for example, screwed to screw holes 21a formed on the surface of the manipulated body 2 through screw holes 2a1.

Figure 3A:
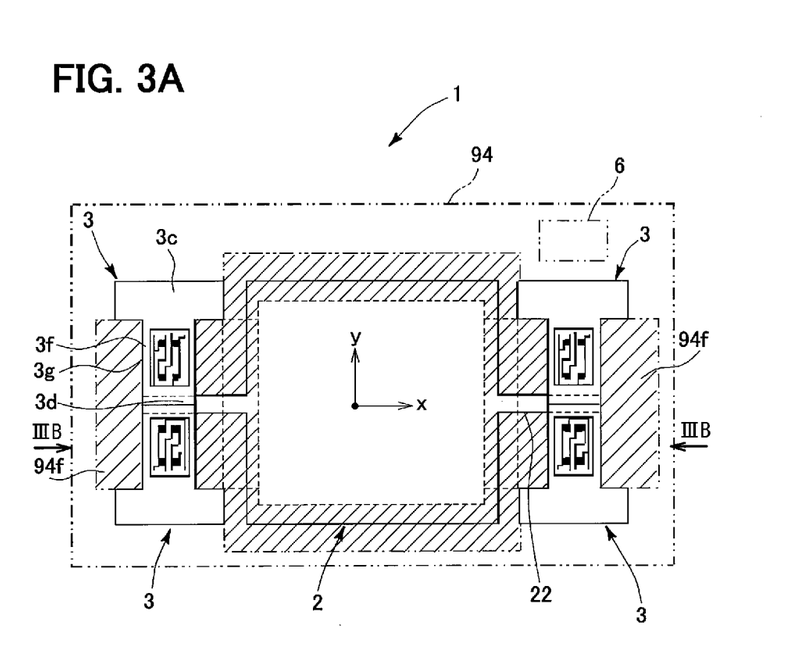
FIG. 3A is a top view showing a manipulated body and a distortion member of the manipulated position detection device.
Figure 3B:
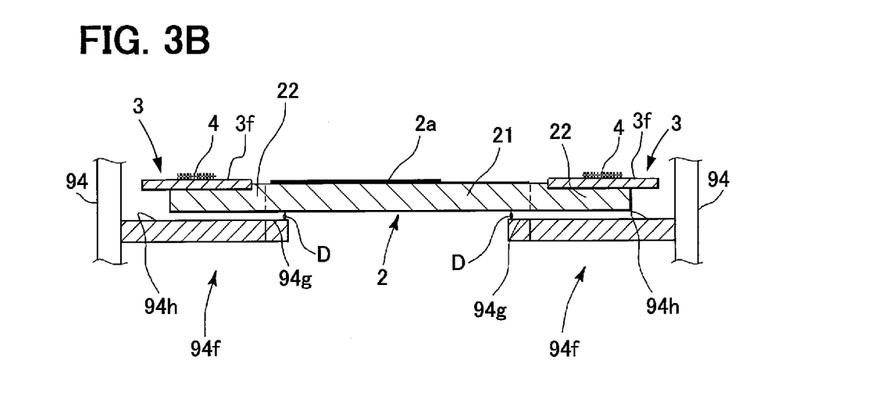
FIG. 3B is a sectional view showing the manipulated body and the distortion member.

The manipulated body 2 includes a main manipulated body 21 and multiple manipulated surface joint portions 22. The main manipulated body 21 is a substantially rectangle plate-like member. Each of the manipulated surface joint portions 22 is substantially square column protruding radially outward from the manipulated surface 2a of the main manipulated body 21. The manipulated body 2 includes at least one pair of the manipulated surface joint portions 22 opposed to each other across the manipulated surface 2a. In the present embodiment, as shown in FIGS. 3A, 3B, two manipulated surface joint portions 22 are symmetric with respect to a straight line extending in the y-axis direction to pass through the center of the manipulated surface 2a being in a substantially square shape. The main manipulated body 21 may be in a rectangular parallelepiped shape or in a cubic shape.

In the present example, two distortion members 3 are connected to the manipulated surface joint portion 22 being a single element. The two distortion members 3 are opposed to each other across the manipulated surface joint portion 22. Joint portions 3d are respectively fastened to tip ends 22a of the manipulated surface joint portions 22 by, for example, gluing or screwing. Fixed portions 3c are further engaged with groove portions 94b of the case 94 and fixed to the case 94. Projected portions 93b of the pressing members 93 are respectively engaged with recesses 94c of the case 94 from the upper side of the distortion members 3 such that the projected portions 93b respectively surround the distortion members 3. The projected portions 93b are screwed to screw holes 94d of the case 94 through the screw holes 93a of the pressing members 93. Thus, the fixed portions 3c of the distortion member 3 are rigidly secured.

FIGS. 3A, 3B are views showing the manipulated body 2 and the distortion member 3. FIG. 3A is a top view showing the manipulated body 2 and the distortion member 3 when viewed from the upper side. FIG. 3B is a sectional view showing the manipulated body 2 and the distortion member 3 taken along the line IIIB-IIIB in FIG. 3A. In the example of FIG. 3, two distortion members 3 are connected to the manipulated surface joint portion 22 such that the manipulated surface joint portion 22 being a single element is interposed between the two distortion members 3. The manipulated surface joint portions 22 are formed along the x-axis of the x-y coordinate system having the zero point on the center of the rectangle-like manipulated surface 2a.

As shown in FIG. 3A, each of the distortion members 3 has an extending portion 3g extending from the joint portion 3d via which the distortion members 3 is connected with the manipulated surface joint portion 22. The extending portion 3g extends in parallel with the manipulated surface 2a. The extending portion 3g has a tip end (fixed portion 3c) fixed to the case 94. The extending portion 3g has a movement transmission surface 3f being resilient element elastically bendable when manipulating force is applied on the manipulated surface 2a.

In the present example, as a user presses the manipulated surface 2a to cause the manipulating force Fz (FIGS. 4A to 4C), the manipulated body 2 moves in the vertical direction Z perpendicular to the manipulated surface 2a. At this time, the movement transmission surface 3f of the distortion member 3 also moves in the vertical direction Z correspondingly to the movement of the manipulated body 2. That is, the movement of the movement transmission surface 3f reflects the movement of the manipulated body 2. A distortion detection element 4 provided on the movement transmission surface 3f detects the elastic deformation in the vertical direction Z as distortion.

As shown in FIG. 3B, the manipulated surface 2a and all the movement transmission surfaces 3f are located on the same plane (at the same level). The manipulated surface 2a and all the movement transmission surfaces 3f may be located on planes at substantially equivalent (same) levels.

The opening 94e of the case 94 may be smaller than the main manipulated body 21, and a gap D may be formed with the main manipulated body 21 to be in a non-contact state. The bottom portion 94f of the case 94 has a surface (first deformation regulation surface) defining a region 94g and a surface (second deformation regulation surface) defining a region 94h. The region 94g is opposed to the rear surface of the manipulated body 2 opposite from the manipulated surface 2a. The region 94h is opposed to the rear surface of the distortion member 3 opposite from the movement transmission surface 3f. The manipulated body 2 is not connected with the case 94 and is not in contact with the case 94. The distortion member 3 excluding fixed portion 3c is not in contact with the case 94.

A signal processing unit 6 (manipulated position arithmetic unit) is accommodated in the case 94. The signal processing unit 6 is, for example, a microprocessor including a generally-known signal-processing circuit. The signal processing unit 6 may include components such as a CPU, a ROM, a RAM, and an A/D conversion circuit. The CPU executes a control program stored in the ROM and functions as the manipulated position detection device 1. Specifically, for example, the CPU calculates the manipulated position and manipulating force caused by pressing manipulation based on elastic deformation detected by the distortion detection element 4.

Figure 4A:
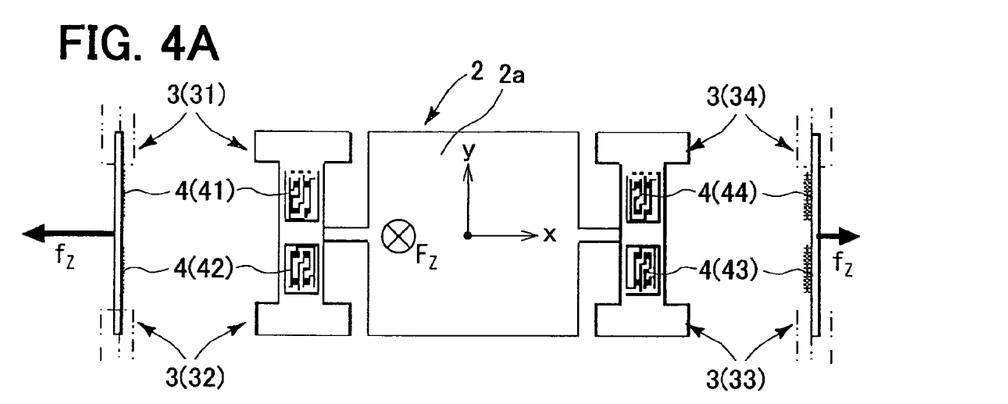
FIGS. 4A to 4C are top views each showing a force working in the distortion member, the force caused by a pressing manipulation on a manipulated surface.
Figure 4B:
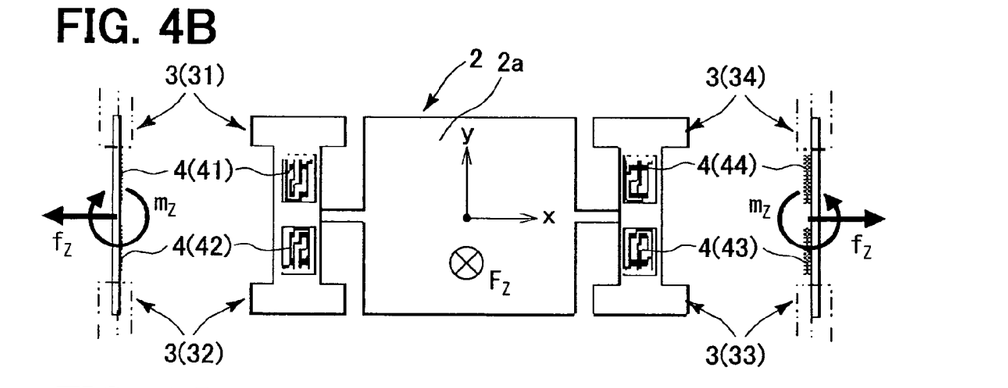

Specifically, as shown in FIGS. 4A, 4B, when the pressing manipulative force Fz works on the manipulated surface 2a, the component force fz of the pressing manipulative force Fz and the moment force mz work on the distortion member 3 fixed to the case 94. The distortion member 3 fixed to the case 94 is bent due to application of the pressing manipulative force Fz. In this way, a tensile stress and a compression stress work in the movement transmission surface 3f being the main surface of the distortion member 3 in the surface direction. In the present example, the distortion detection element 4 is provided on the movement transmission surface 3f. Therefore, the distortion detection element 4 detects expansion and shrinkage caused in the movement transmission surface 3f due to the tensile stresses and the compression stress.

Subsequently, the force on the distortion member 3 caused by the pressing manipulative force on the manipulated surface 2a will be described with reference to FIGS. 4A to 4C. As shown in FIG. 4A, when the pressing manipulative force Fz is applied in the z-axis direction, which is perpendicular to the manipulated surface 2a, on the x-axis in the x-y coordinate system having the zero point on the center of the rectangle-like manipulated surface 2a, only the force fz works on the distortion member 3 (31 to 34). Alternatively, as shown in FIG. 4B, when the pressing manipulative force Fz is applied in the z-axis direction perpendicular to the manipulated surface 2a on the y-axis direction, the force fz and the moment mz arise in the distortion member 3 (31 to 34).

Figure 5A:
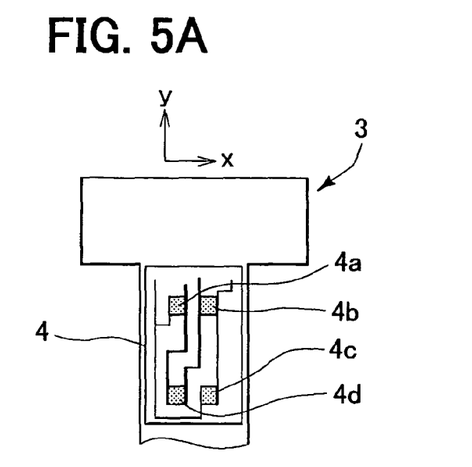
FIGS. 5A, 5B are views each showing a stress working on the movement transmission surface of the distortion member when a pressing force is applied in the direction perpendicular to the manipulated surface.
Figure 5B:
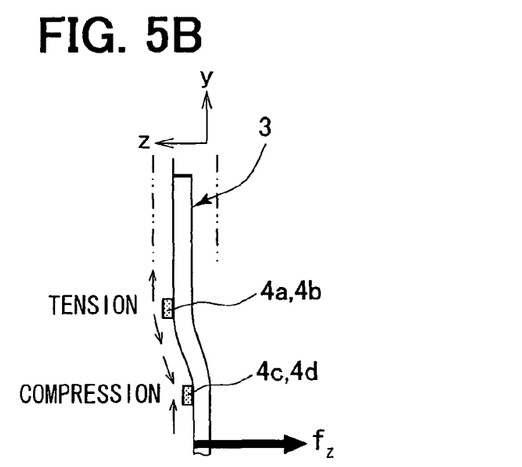
Figure 6A:
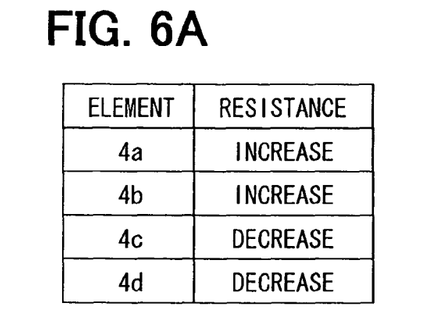
FIGS. 6A, 6B are views showing change in resistance in distortion detection elements and an equivalent circuit of the distortion detection elements.
Figure 6B:
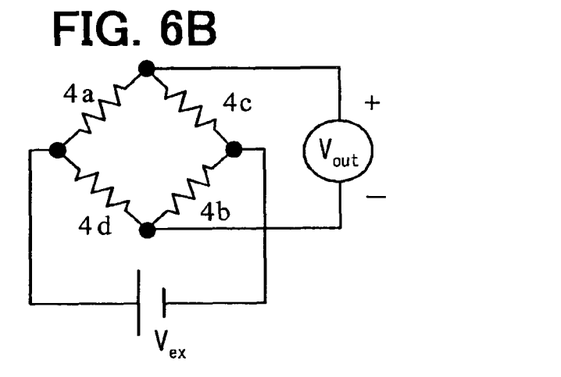

As shown in FIG. 5A, each distortion detection element 4 (41 to 44) includes elements 4a to 4d arranged in this manner. As shown in FIG. 5B, tensile stress and compression stress work on the movement transmission surfaces 3f of the distortion member 3 in corresponding portions of the elements 4a to 4d of the distortion detection element 4. An equivalent circuit of the distortion detection element 4 is shown by a bridged circuit in FIG. 6B. As shown in FIG. 6A, resistance increases in the elements 4a, 4b in which tensile stress arises, and resistance decreases in the elements 4c, 4d in which compression stress arises. Change in the bridge voltage Vout in the bridged circuit of FIG. 6B is detected, and the signal processing unit 6 calculates the force fz and the moment mz working in the distortion member 3.

Figure 4C:
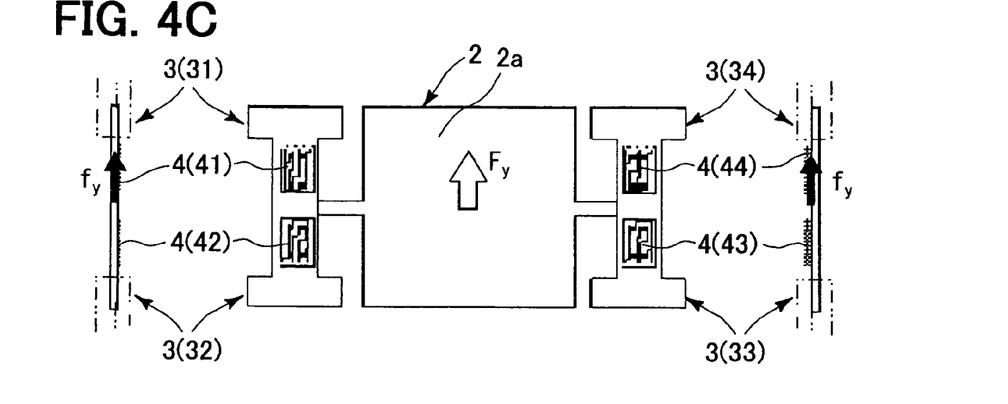
Figure 7A:
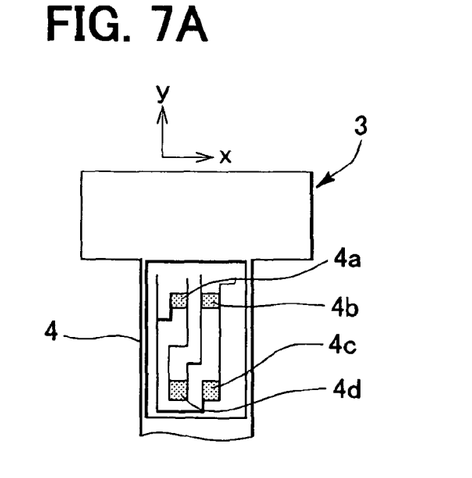
FIGS. 7A, 7B are views each showing a stress working on the movement transmission surface of the distortion member when a pressing force is applied in the in-plane direction of the manipulated surface.
Figure 7B:
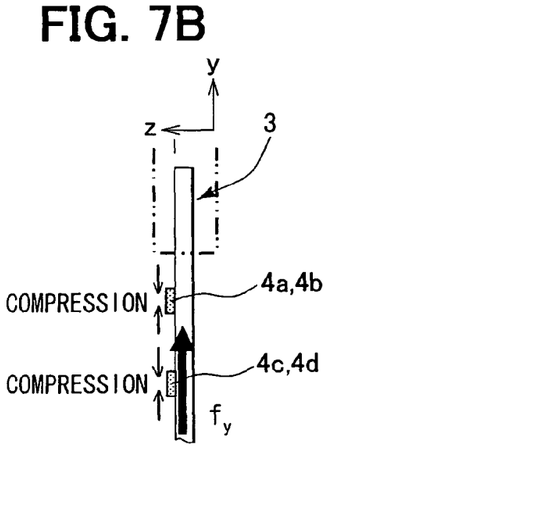

In FIG. 4C, the force Fy is applied to the manipulated surface 2a in the surface direction. In this case, stress works in the elements 4a to 4d of the distortion detection element 4 arranged as shown in FIG. 7A. As shown in FIG. 7B, compression stress works in all the four elements 4a to 4d, or tensile stress works in all the four elements 4a to 4d. Therefore, no change arises in the bridge voltage Vout of the bridged circuit of FIG. 6B. That is, the manipulated position detection device 1 does not have a sensitivity with respect to the force in the surface direction. Therefore, when the force fz and the moment force mz working in the distortion member 3 are calculated, the force applied in the surface direction may be excluded from consideration.

Figure 8A:
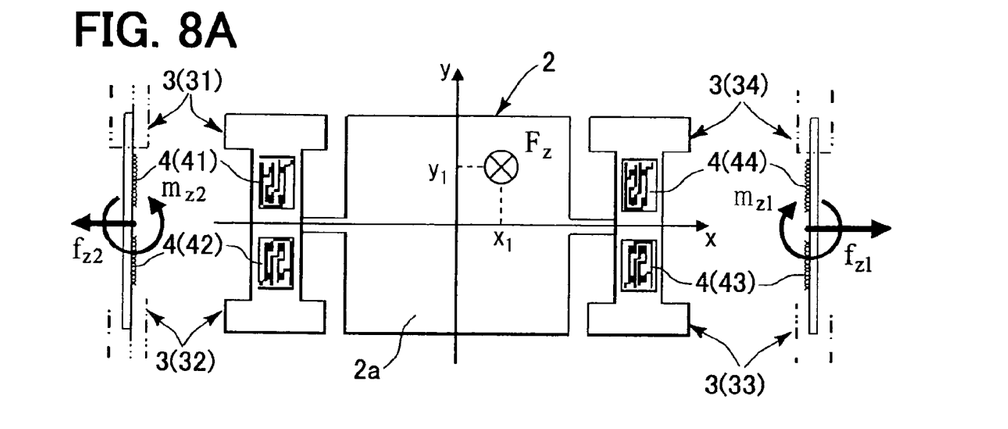
FIGS. 8A, 8B are views showing the manipulated position detection device and a calculating method for a center position of the manipulating force applied to the manipulated surface.
Figure 8B:
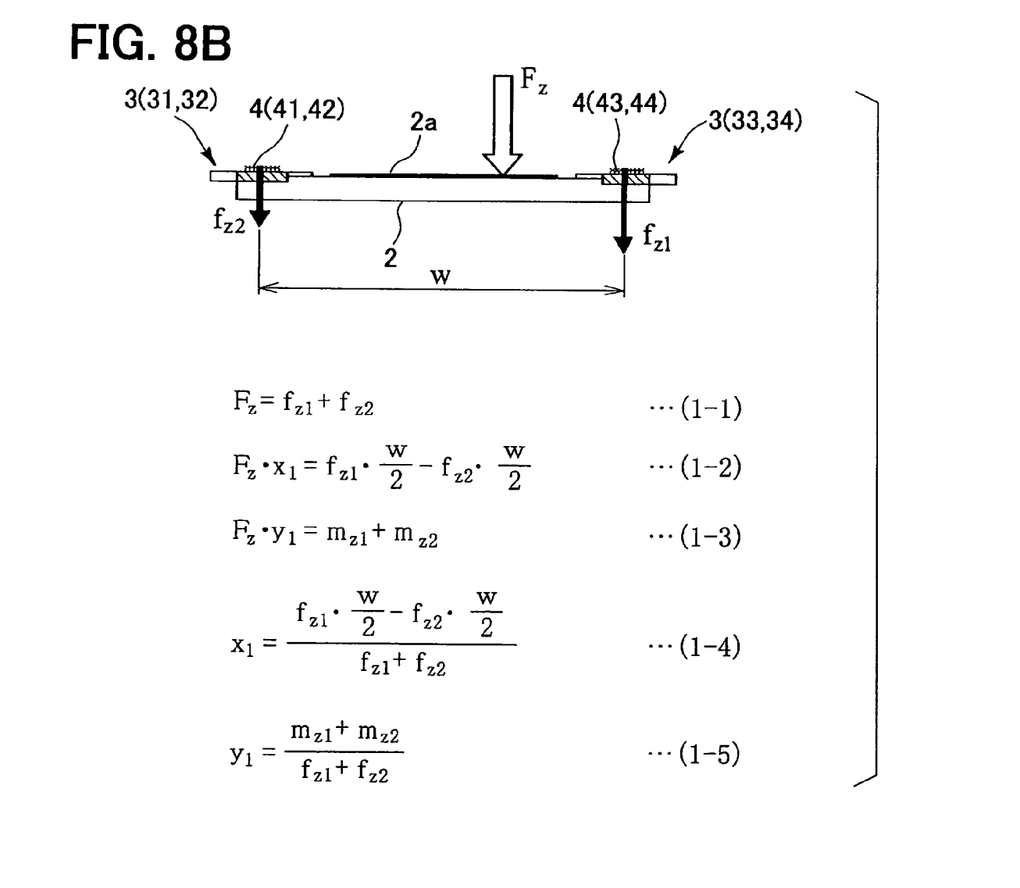

As shown in FIGS. 8A, 8B, the signal processing unit 6 calculates the force fz (fz1, fz2) and the moment mz (mz1, mz2) applied to each distortion member 3 based on the bridge voltage Vout of the bridged circuit including the distortion detection element 4 (41 to 44). The signal processing unit 6 substitutes the calculated values fz, mz into the equations (1-4) and (1-5) to calculate the center position of the manipulating force Fz applied to the manipulated surface 2a. The center position of the manipulating force Fz corresponds to the manipulated position (x1, y1). The equations (1-4) and (1-5) can be derived from the equation of balance of force (1-1), the equation of balance of moment around the y-axis (1-2), and the equation of balance of moment around the x-axis (1-3). The distance w is the length between the centerline (31, 32) of the distortion member 3 on one side and the centerline (33, 34) of the distortion member 3 on the other side each being in parallel with the y-axis.

Figure 9:
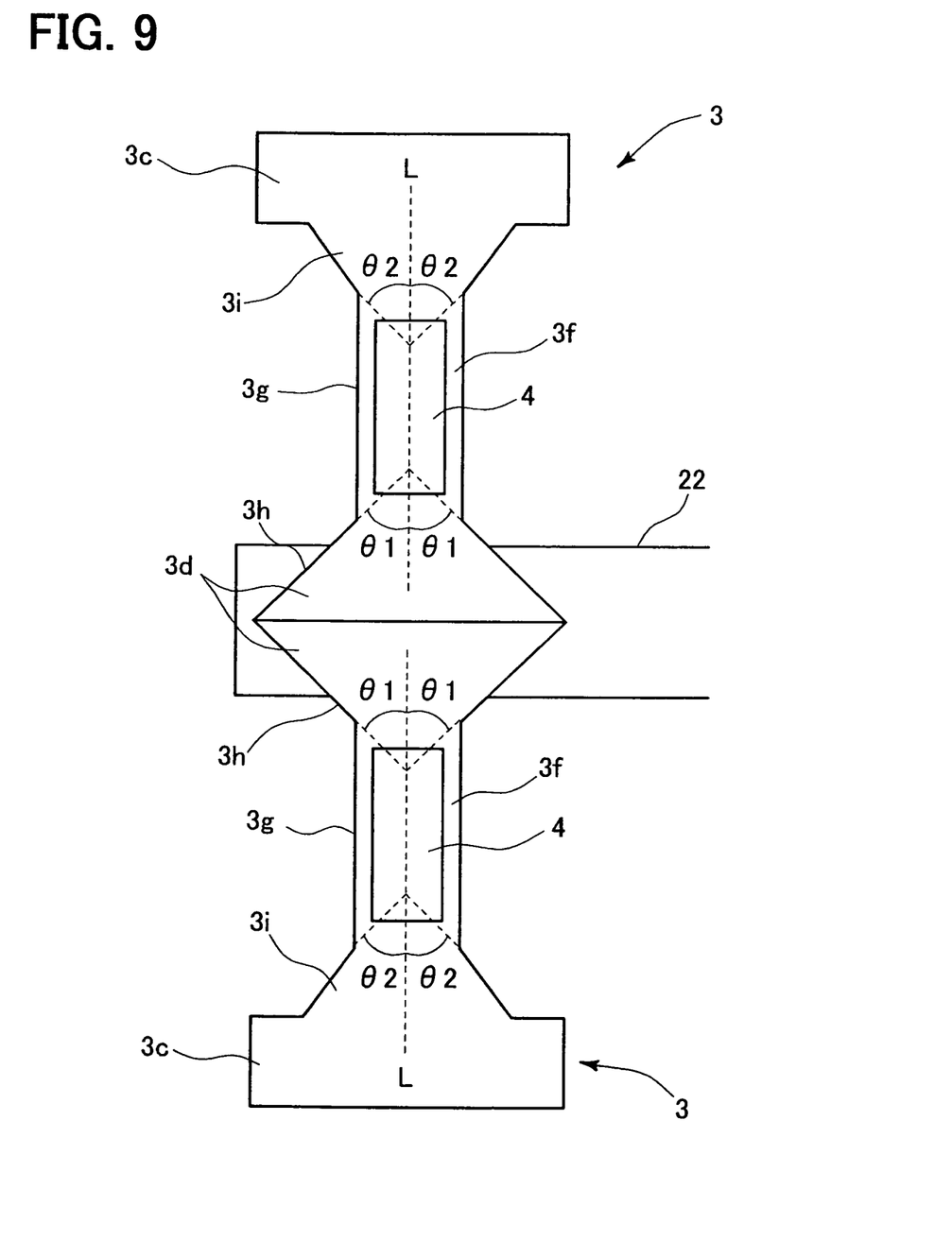
FIG. 9 is a view showing another example of a distortion member.

FIG. 9 is a view showing another example of the distortion member 3 shown in FIGS. 3A, 3B. In the example of FIG. 9, the distortion member 3 includes a base end side tapered portion 3h, a tip end side tapered portion 3i, and the extending portion 3g. The base end side tapered portion 3h extends from the joint position connected with the manipulated surface joint portion 22 in the direction perpendicular to the direction in which the manipulated surface joint portion 22 extends. The base end side tapered portion 3h reduces in width from the joint portion 3d connected with the manipulated surface joint portion 22 toward the extended tip end (fixed portion 3c). The tip end side tapered portion 3i reduces in width from the fixed portion 3c fixed with the case 94 toward the joint portion 3d connected with the manipulated surface joint portion 22. The extending portion 3g connects the base end side tapered portion 3h with the tip end side tapered portion 3i. The extending portion 3g has the movement transmission surfaces 3f.

The base end side tapered portion 3h is at the angle θ1 relative to the axis L, along which the extending portion 3g extends, on the side of the joint portion 3d connected with the manipulated surface joint portion 22. The tip end side tapered portion 3i is at the angle θ2 relative to the axis L, along which the extending portion 3g extends, on the side of the fixed portion 3c connected with the case 94. The angle θ1 is, for example, greater than or equal to 30 degrees and less than or equal to 60 degrees. The angle θ2 is, for example, greater than or equal to 30 degrees and less than or equal to 60 degrees.

(Second Embodiment)

Figure 10A:
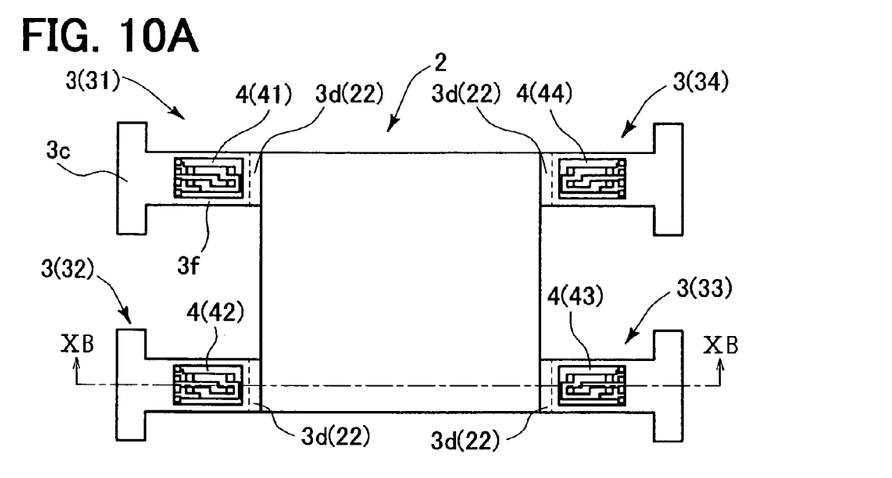
FIGS. 10A, 10B are views showing a manipulated position detection device according to the second embodiment.
Figure 10B:
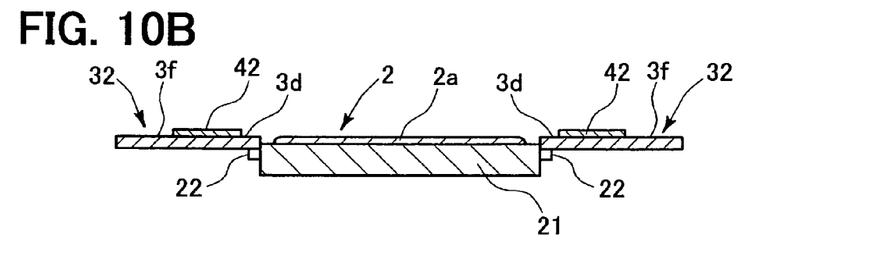

FIGS. 10A, 10B are views each showing a manipulated position detection device according to the second embodiment. FIG. 10A is a top view showing the manipulated position detection device according to the second embodiment. FIG. 10B is a sectional view taken along the line XB-XB in FIG. 10A. In the present example, the distortion members 3 are respectively provided to the manipulated surface joint portions 22 each projected from the four corners of the manipulated body 2 being in a rectangle shape. That is, one distortion member is connected to corresponding one manipulated surface joint portion. The structure of the distortion member 3 and the structure of the distortion detection element 4 are similar to those in the first embodiment. In the first embodiment, large stress may arise in the joint portions between the manipulated body 2 and the two distortion members 3. Contrary, in the present embodiment, stress may be distributed to four places, and thereby reliability and durability of the device may be enhanced. Also in the present embodiment and in the following embodiments, the manipulated surface 2a and all the movement transmission surfaces 3f are located on the same plane, or the manipulated surface 2a and all the movement transmission surfaces 3f may be located on planes at substantially equivalent (same) levels.

(Third Embodiment)

Figure 11:
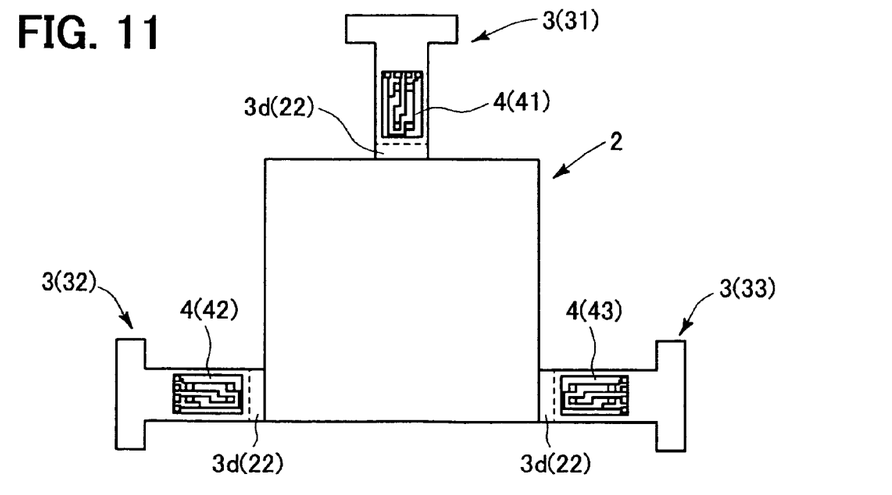
FIG. 11 is a view showing a manipulated position detection device according to the third embodiment.

FIG. 11 is a top view showing a manipulated position detection device according to the third embodiment. The manipulated position detection device of FIG. 11 including the three distortion members 3 is a modification of the manipulated position detection device of FIG. 10 including the four distortion members 3 (distortion detection elements 4). In FIG. 11, the three distortion members 3 are located on the periphery of the manipulated body 2. It suffices that the manipulated body 2 has at least three distortion detection elements 4 for detecting the barycenter position. The number of the distortion detection elements can be reduced in the present embodiment. Therefore, the production cost of the manipulated position detection device can be reduced.

(Fourth Embodiment)

Figure 12:
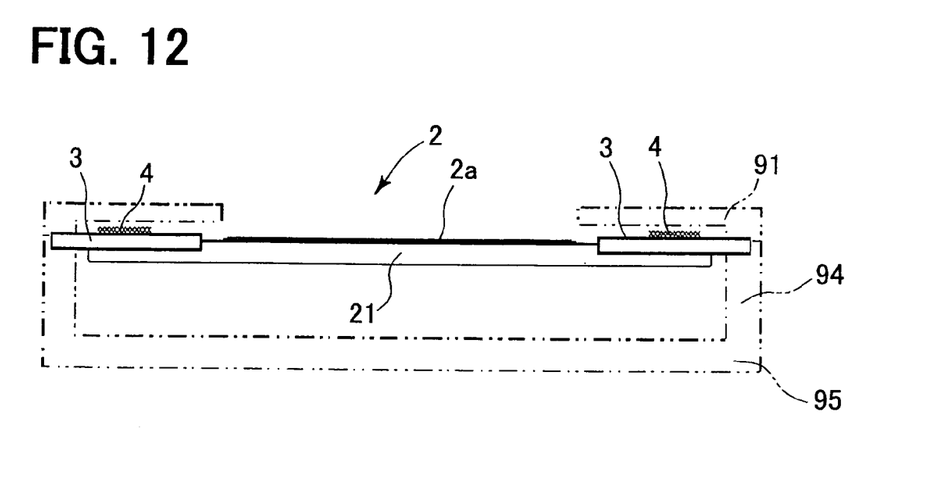
FIG. 12 is a view showing a manipulated position detection device according to the fourth embodiment.
Figure 13:
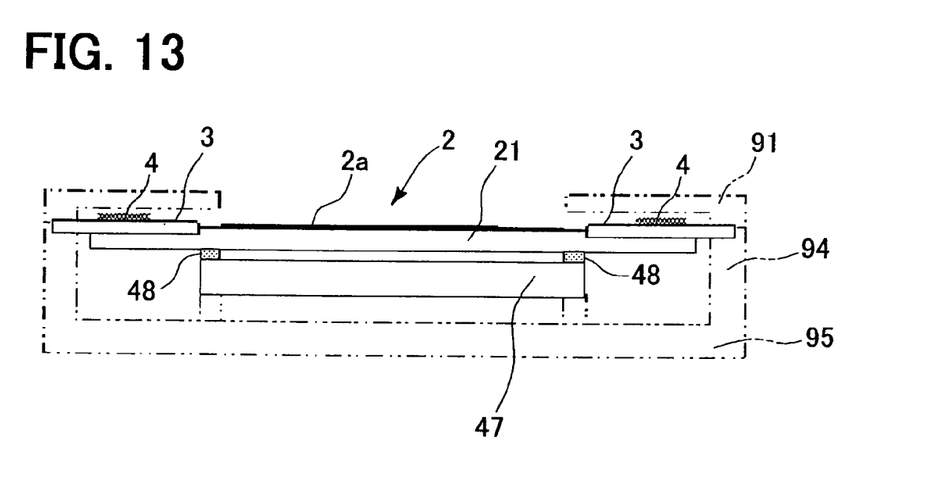
FIG. 13 is a view showing the manipulated position detection device according to the fourth embodiment.

FIG. 12 is a view showing a manipulated position detection device according to a comparative example. FIG. 13 is a view showing a manipulated position detection device according to the fourth embodiment. As shown in FIG. 12, the manipulated position detection device of the first to third embodiments does not have a display unit on the rear side of the manipulated surface. In the present embodiment, as shown in FIG. 13, the manipulated position detection device may be a touch panel (touch screen) having a display unit 47, such as an LCD device, on the rear side of the manipulated surface. The additional display unit 47 enables a user to implement a further direct operation. A sealing member 48 may be provided between the manipulated body 2 and the display unit 47. In the present structure, operation effects, such as vibration proof, protection against dust, and waterproofing, can be obtained.

(Fifth Embodiment)

Figure 14A:
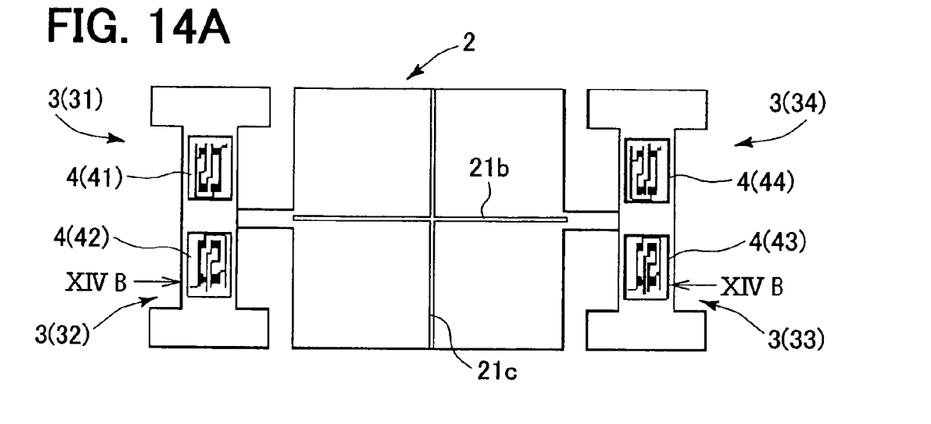
FIGS. 14A, 14B are views showing a manipulated position detection device according to the fifth embodiment.
Figure 14B:
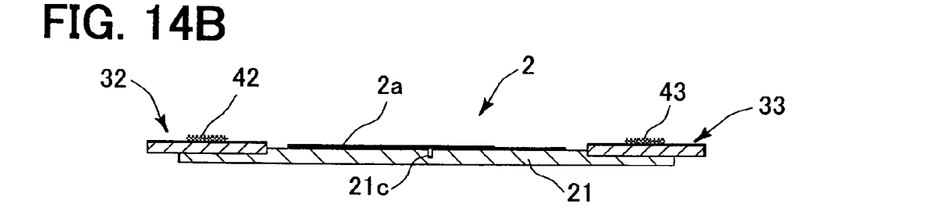

FIGS. 14A, 14B and FIGS. 15A, 15B are views showing a manipulated position detection device according to the fifth embodiment. The manipulated position detection device shown in FIGS. 14A, 14B has groove portions 21b, 21c additionally provided to the main manipulated body 21 of the manipulated body 2 or the surface of the manipulated surface 2a of the first embodiment. FIG. 14A is a top view showing the manipulated position detection device. FIG. 14B is a sectional view taken along the line XIVB-XIVB in FIG. 14A. The number of the groove portions and the direction of the groove portions may be arbitrary determined.

Figure 15A:
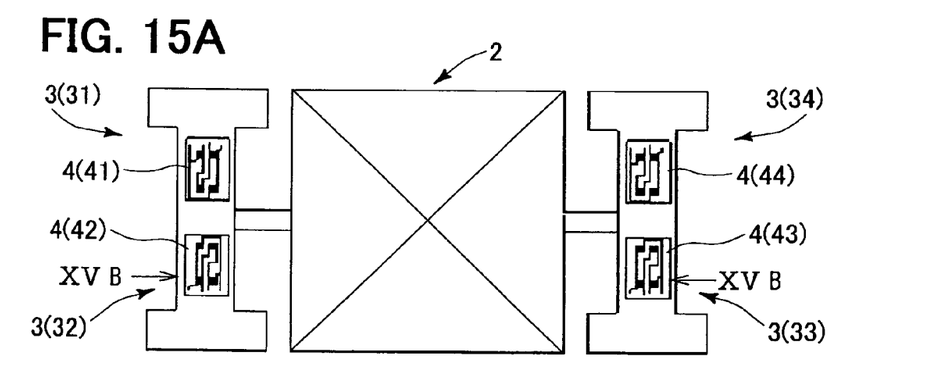
FIGS. 15A, 15B are views showing the manipulated position detection device according to the fifth embodiment.
Figure 15B:
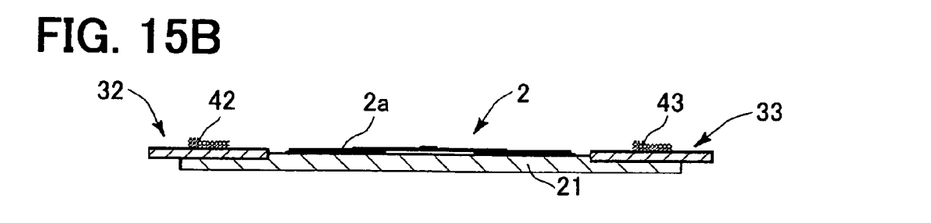

In FIGS. 15A, 15B, the manipulated surface 2a of the manipulated body 2 is substantially in a raised shape (bulge) provided to the manipulated position detection device in the first embodiment. FIG. 15A is a top view showing the manipulated position detection device. FIG. 15B is a sectional view taken along the line XVB-XVB in FIG. 15A. In the example of FIGS. 15A, 15B, the center portion of the rectangle-like manipulated surface 2a is at the highest position. It is noted that the height of the projected portion may be determined to be low such that the detection accuracy of the deviation barycenter (xd), which can be calculated by the equation (2-3) of FIG. 17, is secured. In addition, the position of the projected portion may be determined such that the position detection accuracy is secured.

According to the above-described examples, the distortion detection unit is provided to the plate-like movement transmission surface, and the movement transmission surface is located substantially on the same surface or on the same surface as the manipulated surface. Thereby, the distortion detection unit has almost no sensitivity in directions other than the direction perpendicular to the manipulated surface, and the distortion detection unit selectively detects the force in the direction perpendicular to the manipulated surface. Therefore, even when the force works in directions other than the direction perpendicular to the manipulated surface, the manipulated position detection device can correctly detect the barycenter position (manipulated position) of the force working on the manipulated surface, without additional components.

The movement transmission surface of the manipulated position detection device is a resilient element elastically bendable (deformable) as the manipulating force works on the manipulated surface. The distortion detection unit is configured to detect elastic deformation caused in each movement transmission surface in the in-plane direction.

With the present structure, the manipulated position detection device can detect the force working selectively (only) in the direction perpendicular to the manipulated surface.

The distortion detection unit of the manipulated position detection device includes the distortion detection element located on the surface of each distortion member.

The distortion detection element is widely used for load detection or the like and promoted in downsizing and cost reduction. With the present structure, the manipulated position can be correctly detected without using components other than the distortion detection element.

The manipulated position arithmetic unit of the manipulated position detection device is configured to calculate the moment caused around the X direction and the Y direction in the X-Y plane and the force working in the Z direction according to the distortion caused by the manipulating force in the distortion detection element. The Z direction intersects perpendicularly to the X-Y plane. The manipulated surface of the manipulated body corresponds to the X-Y plane in the two-dimensional orthogonal coordinate system. The manipulated position arithmetic unit is further configured to calculate the barycenter position as the manipulated position according to the calculated moment and the calculated force.

With the present structure, the manipulated position can be calculated by using the conventional method shown in FIGS. 16A, 16B, and FIG. 17. Therefore, the manipulated position detection device can be produced at low cost and in a short period, since development of a new calculating method is not needed.

The manipulated body of the manipulated position detection device includes the main manipulated body and the multiple manipulated surface joint portions. The main manipulated body has the manipulated surface. Each of the multiple manipulated surface joint portions extends outward from the main manipulated body centering on the manipulated surface in the same surface as the manipulated body. At least one pair of the manipulated surface joint portions is provided to the manipulated surface joint portion. The at least one pair of the manipulated surface joint portions are opposed to each other and located to interpose the manipulated surface therebetween. The tip end of the manipulated surface joint portion is connected with the joint portion of the distortion member.

In the present structure, a manipulative movement can be efficiently transmitted to the distortion detection unit (distortion member).

The distortion member of the manipulated position detection device includes the extending portion extending from the joint portion. The tip end of the extending portion forms the fixed portion. The extending portion defines the movement transmission surface. The distortion detection unit is provided on the movement transmission surface.

In the present structure, the joint portion, the distortion member, and the movement transmission surface are integrally formed.

The case of the manipulated position detection device is non-contact with a remaining portion of the manipulated body and the distortion member other than the fixed portion to have a gap relative to the remaining portion.

With the present structure, the manipulated body and the distortion member can be fixed to the case so that pressing manipulation to the manipulated surface may not be disturbed.

The case of the manipulated position detection device has a first deformation regulation surface opposed to the rear surface of the manipulated surface of the manipulated body to have a predetermined gap therebetween.

With the present structure, deformation of the manipulated body is restricted when an excessive pressure is applied to the manipulated surface. In addition, the manipulated position can be correctly detected.

The case of the manipulated position detection device has a second deformation regulation surface opposed to the rear surface of the movement transmission surface of the distortion member to have a predetermined gap therebetween.

With the present structure, deformation of the movement transmission surface can be restricted when an excessive pressure is applied to the distortion member or the manipulated surface.

One distortion member of the manipulated position detection device is connected to one manipulated surface joint portion.

With the present structure, at least three manipulated surface joint portions are formed, and each of which is connected with the distortion member. At least three distortion detection units are sufficient for detecting the barycenter position (manipulated position). With the present structure, the number of the distortion detection elements can be reduced. Therefore, the production cost of the manipulated position detection device can be reduced.

Two distortion members of the manipulated position detection device are connected to one manipulated surface joint portion. The two distortion members interpose the one manipulated surface joint portion therebetween.

With the present structure, the manipulated position can be calculated by using the conventional method. Therefore, the manipulated position detection device can be produced at low cost and in a short period, since development of a new calculating method is not needed.

In the manipulated position detection device, two distortion members are connected to the same position (common position) in the manipulated surface joint portion to intersect perpendicularly to the manipulated surface joint portion. The extending portion includes the tip end side tapered portion and the base end side tapered portion. The tip end side tapered portion decreases in width from the joint portion connected with the manipulated surface joint portion toward the movement transmission surface. The base end side tapered portion reduces in width from the movement transmission surface toward the fixed position fixed with the case.

With the present structure, the distortion member can be sufficiently secured. In addition, the manipulated position detection device can detect a minute movement and a distortion caused in the movement transmission surface with sufficient accuracy.

The manipulated position detection device includes the base end side tapered portion and the tip end side tapered portion. The base end side tapered portion is at the angle relative to the axis of the extension direction of the extending portion on the side of the fixed position connected with the manipulated surface joint portion, and the angle is greater than or equal to 30 degrees and is less than or equal to 60 degrees. The tip end side tapered portion at the angle relative to the axis of the extension direction of the extending portion on the side of the fixed position fixed to the case, and the angle is greater than or equal to 30 degrees and is less than or equal to 60 degrees.

With the present structure, the distortion member can be sufficiently secured. In addition, the manipulated position detection device can detect a minute movement and a distortion caused in the movement transmission surface with sufficient accuracy.

In the manipulated position detection device, the manipulated surface of the manipulated body has the groove portion on its surface. The groove portion divides the manipulated surface into multiple manipulated regions.

In the present structure, the manipulated surface is divided such that a user can recognize the manipulated region from a tactile sense of a finger when manipulating the device. Therefore, a user can manipulate the device without staring at a screen. Thus, operability of the device can be enhanced. The feature of the groove portion may be suitable for a display unit equipped in a vehicle.

In the manipulated position detection device, the manipulated surface of the manipulated body may be in a substantially raised shape in the direction of the surface.

With the present structure, a user can recognize the manipulated region from a tactile sense of a finger when manipulating the device. Therefore, a user can implement a desirable manipulation of the device, without staring at a screen.

The above structures of the embodiments can be combined as appropriate.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

Various modifications and alternations may be diversely made to the above embodiments without departing from the spirit of the present invention.

What is claimed is:

1. A manipulated position detection device comprising:
    a manipulated body including a manipulated surface portion being in a plate shape;
    a case accommodating the manipulated body;
    four distortion members, each distortion member being in a plate shape, each distortion member having a joint portion connected with a periphery of the manipulated surface portion at one end, each distortion member further having a fixed portion fixed to the case at an other end, each distortion member having a movement transmission surface between the joint portion and the fixed portion, the movement transmission surface being movable according to a manipulating force caused by pressure applied to the manipulated surface portion;
    four distortion detection elements, each distortion detection element adhered only to the movement transmission surface of a corresponding distortion member and configured to detect a distortion of the movement transmission surface caused by a movement of the corresponding distortion member; and
    an arithmetic unit configured to calculate a manipulating force working on the manipulated surface portion and a manipulated position on which a manipulating force works, according to a detection result of each distortion detection element, wherein
    the manipulated surface portion and all the movement transmission surface are located on a same plane,
    the manipulated body includes a main manipulated body and only one pair of manipulated surface joint portions,
    the main manipulated body has the manipulated surface portion,
    the pair of manipulated surface joint portion are projected radially outward from the manipulated surface portion in a same surface as the manipulated body, the pair of the manipulated surface joint portions are opposed to each other to interpose the manipulated surface portion therebetween, the joint portions are two of the four distortion members are joined together to a tip end of one of the pair of manipulated surface joint portions and located opposite to each other with respect to the one of the pair of manipulated surface joint portions, and the joint portions of the other two of the four distortion members are joined together to a tip end of the other of the pair of manipulated surface joint portions and located opposite to each other with respect to the other of the pair of manipulated surface joint portions.

2. The manipulated position detection device according to claim 1, wherein each distortion member is a resilient element elastically bendable correspondingly to a manipulating force working on the manipulated surface portion, and each distortion detection element detects an elastic deformation caused in the movement transmission surface in an in-plane direction of the movement transmission surface.

3. The manipulated position detection device according to claim 1, wherein the arithmetic unit is configured to calculate, according to a distortion caused in each distortion detection element correspondingly to a manipulating force, an X-moment caused around an X direction on an X-Y plane, a Y-moment caused around a Y direction on the X-Y plane, and a Z-force in a Z direction perpendicular to the X-Y plane, wherein the X-Y plane being in a two-dimensional orthogonal coordinate system on the manipulated surface portion of the manipulated body, and the arithmetic unit is further configured to calculate a barycenter position as the manipulated position according to only the X-moment, Y-moment, and the Z-force.

4. The manipulated position detection device according to claim 3, wherein each distortion member is a resilient element elastically bendable in the Z-direction correspondingly to the manipulating force working in the Z-direction on the manipulated surface portion so that the movement transmission surface is distorted in a direction from the joint portion to the fixed portion.

5. The manipulated position detection device according to claim 1, wherein each distortion member includes an extending portion extending from the joint portion, the extending portion has a tip end defining the fixed portion, the extending portion defines the movement transmission surface, and each distortion detection element is provided on the corresponding movement transmission surface.

6. The manipulated position detection device according to claim 1, wherein the case is spaced from the manipulated body and each distortion detection element except the fixed portion.

7. The manipulated position detection device according to claim 6, wherein the case has a deformation regulation surface opposed to a rear surface of the manipulated body, the rear surface of the manipulated body is on an opposite side of the manipulated surface portion, and the deformation regulation surface has a predetermined gap with the rear surface of the manipulated body.

8. The manipulated position detection device according to claim 6, wherein the case has a deformation regulation surface opposed to a rear surface of the distortion member, the rear surface of the distortion member is on an opposite side of the movement transmission surface, and the deformation regulation surface has a predetermined gap with the rear surface of the distortion member.

9. The manipulated position detection device according to claim 1, wherein the manipulated surface portion of the manipulated body has a groove portion dividing the manipulated surface portion into a plurality of manipulated regions.

10. The manipulated position detection device according to claim 1, wherein the manipulated surface portion of the manipulated body is in a convex shape.

* * * * *